United States Patent
Hirokawa et al.

(10) Patent No.: US 9,692,927 B2
(45) Date of Patent: Jun. 27, 2017

(54) DEVICE, INFORMATION PROCESSING SYSTEM, AND INFORMATION PROCESSING METHOD

(71) Applicants: Tomoya Hirokawa, Kanagawa (JP); Mitsuo Ando, Fukuoka (JP)

(72) Inventors: Tomoya Hirokawa, Kanagawa (JP); Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 29 days.

(21) Appl. No.: 14/089,854

(22) Filed: Nov. 26, 2013

(65) Prior Publication Data

US 2014/0146363 A1  May 29, 2014

(30) Foreign Application Priority Data

Nov. 29, 2012 (JP) ................................ 2012-260699
Oct. 24, 2013 (JP) ................................ 2013-220766

(51) Int. Cl.
*G06K 15/10* (2006.01)
*H04N 1/00* (2006.01)

(52) U.S. Cl.
CPC ..... *H04N 1/00941* (2013.01); *H04N 1/00225* (2013.01); *H04N 1/00244* (2013.01); *H04N 2201/0087* (2013.01); *H04N 2201/0094* (2013.01)

(58) Field of Classification Search
USPC ....................................................... 358/1.15
See application file for complete search history.

(56) References Cited

U.S. PATENT DOCUMENTS

| 2003/0014368 A1* | 1/2003 | Leurig ............... G06Q 20/0425 705/64 |
| 2007/0156920 A1* | 7/2007 | Hoshino et al. .............. 709/238 |
| 2008/0005029 A1 | 1/2008 | Ando |
| 2008/0079986 A1* | 4/2008 | Ferlitsch ................ G03G 21/02 358/1.15 |
| 2010/0325199 A1 | 12/2010 | Park et al. |
| 2011/0075199 A1* | 3/2011 | Jung et al. .................... 358/1.15 |
| 2011/0202915 A1* | 8/2011 | Kuroyanagi .............. G06F 8/61 717/178 |

(Continued)

FOREIGN PATENT DOCUMENTS

| JP | 2004-126908 | 4/2004 |
| JP | 3721070 | 11/2005 |

(Continued)

OTHER PUBLICATIONS ch001186  https://web.archive.org/web/20100107132401/http://www.computerhope.com/issues/ch001186.htm (Oct. 7, 2010).*

*Primary Examiner* — Huo Long Chen
(74) *Attorney, Agent, or Firm* — IPUSA, PLLC

(57) ABSTRACT

A device includes an input part configured to input data, a first transmission part configured to transmit the data to a predetermined transmission destination, a second transmission part configured to transmit the data to a transmission destination different from the predetermined transmission destination, and a transmission control part configured to cause the second transmission part to transmit the data in response to receiving a request to transmit the data from the first transmission part.

18 Claims, 12 Drawing Sheets

(56) References Cited

U.S. PATENT DOCUMENTS

| | | | |
|---|---|---|---|
| 2011/0235095 A1* | 9/2011 | Kudo et al. ................... | 358/1.15 |
| 2011/0271324 A1* | 11/2011 | Ikeda .............................. | 726/3 |
| 2013/0042232 A1 | 2/2013 | Hirokawa | |
| 2013/0073719 A1 | 3/2013 | Ando | |
| 2013/0094053 A1* | 4/2013 | Shirai ........................ | 358/1.15 |
| 2013/0135675 A1* | 5/2013 | Hashimoto .......... | H04N 1/0097 |
| | | | 358/1.15 |
| 2013/0219260 A1 | 8/2013 | Hirokawa | |

FOREIGN PATENT DOCUMENTS

| | | |
|---|---|---|
| JP | 2008-016013 | 1/2008 |
| JP | 2008-065852 | 3/2008 |
| JP | 2011-003187 | 1/2011 |
| JP | 2011-044035 | 3/2011 |

\* cited by examiner

FIG.8

| USERNAME | PASSWORD | PROCESS INFORMATION | TRANSMISSION DESTINATION INFORMATION |
|---|---|---|---|
| aaa | ... | OCR | ... |
|  |  |  |  |
|  |  |  |  |

231

DEVICE, INFORMATION PROCESSING SYSTEM, AND INFORMATION PROCESSING METHOD

CROSS-REFERENCE TO RELATED APPLICATIONS

The present application is based upon and claims the benefit of priority of Japanese Patent Applications No. 2012-260699, filed on Nov. 29, 2012, and No. 2013-220766, filed on Oct. 24, 2013, the entire contents of which are incorporated herein by reference.

BACKGROUND OF THE INVENTION

1. Field of the Invention

The present invention relates to devices, information processing systems, and information processing methods.

2. Description of the Related Art

There have been image forming apparatuses in which an application program (hereinafter simply referred to as "application") that implements a function of transmitting scanned image data to a set transmission destination may be installed. Transmission destinations that may be set with respect to such an application have been limited to transmission destinations to which transmission may be performed by a communication method that the application is determined to use.

On the other hand, in recent years, services that receive image data and perform predetermined processing on the image data, such as online storage and other cloud services, have been provided on networks such as the Internet. These services need to be accessed using communication methods unique to the services. Therefore, the conventional application may not be able to transmit image data to these services.

When it is desired to make it possible to transmit scanned image data to such services, for example, the source code of the conventional application may be altered so as to allow such services to be set as transmission destinations. Alternatively, a new application that makes it possible to set such services as transmission destinations may be developed.

Reference may be made to Japanese Laid-Open Patent Application No. 2011-44035 for related techniques.

SUMMARY OF THE INVENTION

According to an aspect of the present invention, a device includes an input part configured to input data; a first transmission part configured to transmit the data to a predetermined transmission destination; a second transmission part configured to transmit the data to a transmission destination different from the predetermined transmission destination; and a transmission control part configured to cause the second transmission part to transmit the data in response to receiving a request to transmit the data from the first transmission part.

According to an aspect of the present invention, in an information processing method, a computer processor implements making a request to transmit input data to a predetermined transmission destination; and causing the data to be transmitted to a transmission destination different from the predetermined transmission destination in response to the request.

According to an aspect of the present invention, an information processing system, which includes a device and at least one information processing apparatus connected to the device via a network, includes an input part configured to input data; a first transmission part configured to transmit the data to a predetermined transmission destination; a second transmission part configured to transmit the data to the at least one information processing apparatus to which the first transmission part is prevented from transmitting the data; and a transmission control part configured to cause the second transmission part to transmit the data in response to receiving a request to transmit the data from the first transmission part.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 8 is a diagram illustrating a configuration of a user information storage part;

DETAILED DESCRIPTION OF THE PREFERRED EMBODIMENTS

In the case of altering the source code of an application that stably operates, however, bugs may be included in the source code to destabilize the operation.

On the other hand, in the case of developing a new application, while the developer wishes to provide a totally new product with an innovative graphical user interface (GUI) or the like, users prefer to use an application with a familiar GUI.

According to an aspect of the present invention, it is possible to extend a range that may be set as transmission destinations of image data.

Figure 1:
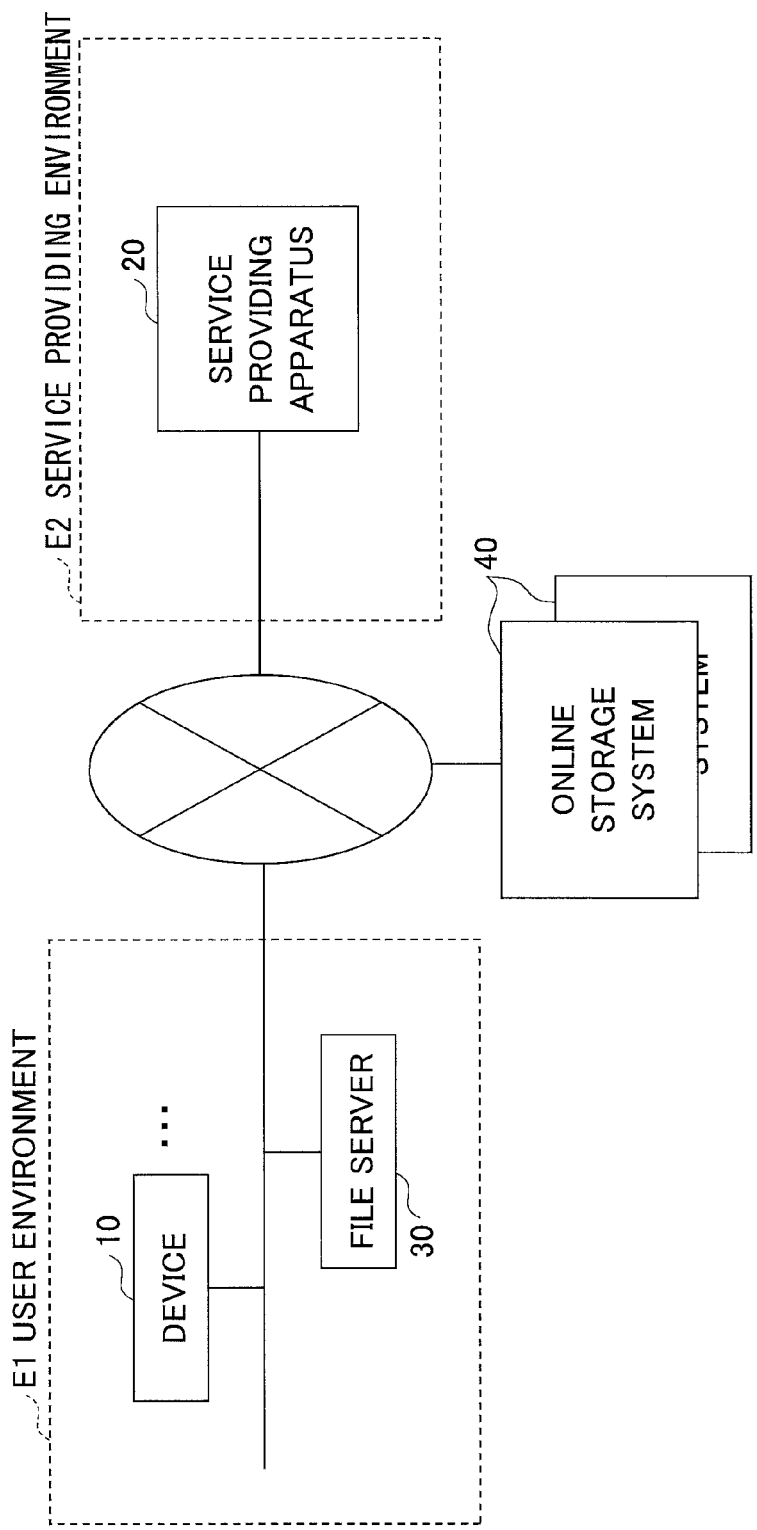
FIG. 1 is a diagram illustrating a configuration of an information processing system according to a first embodiment.

A description is given below, with reference to the accompanying drawings, of embodiments of the present invention. FIG. 1 is a diagram illustrating a configuration of an information processing system according to a first embodiment. An information processing system 1 illustrated in FIG. 1 includes a user environment E1, a service providing environment E2, and online storage systems 40 (hereinafter collectively referred to as "online storage system 40"), which may communicate with one another via a wide area network such as the Internet.

The service providing environment E2 is a system environment in an organization that provides a cloud service via a network. In this embodiment, a description is given, taking a cloud service as a specific example. This embodiment, however, may also be applied to services provided via a network, such as services provided by application service provider (ASP)s and Web services.

The service providing environment E2 includes a service providing apparatus 20 (an information processing apparatus). The user environment E1 includes one or more devices 10, which may be hereinafter collectively referred to as "device 10". The service providing apparatus 20 provides a service that is achieved by causing the device 10 in the user environment E1 to cooperate with an application in the service providing apparatus 20. Hereinafter, such a form of service is referred to as "device cooperation service." A service to store image data scanned in the device 10 of the user environment E1 in a preset storage destination by an application in the service providing apparatus 20 (hereinafter referred to as "scan-to-storage service") is one example of the device cooperation service. The service providing apparatus 20 may be installed in the user environment E1.

The user environment E1 is a system environment in an organization such as a corporation that uses the device 10. In the user environment E1, the device 10, a file server 30, etc., are connected via a network such as a local area network (LAN).

The device 10 is a device that serves as a candidate object of cooperation with the device cooperation service. The file server 30 is, for example, a computer that operates as a common file server. The file server 30 may be a database server or the like.

The online storage system 40 is a computer system that provides a cloud service called "online storage" via a network. The online storage is a service to lend out a storage area of a storage. In this embodiment, the storage area lent out by the online storage is a candidate for a storage destination of image data in a scan-to-storage service provided by the service providing apparatus 20.

Figure 2:
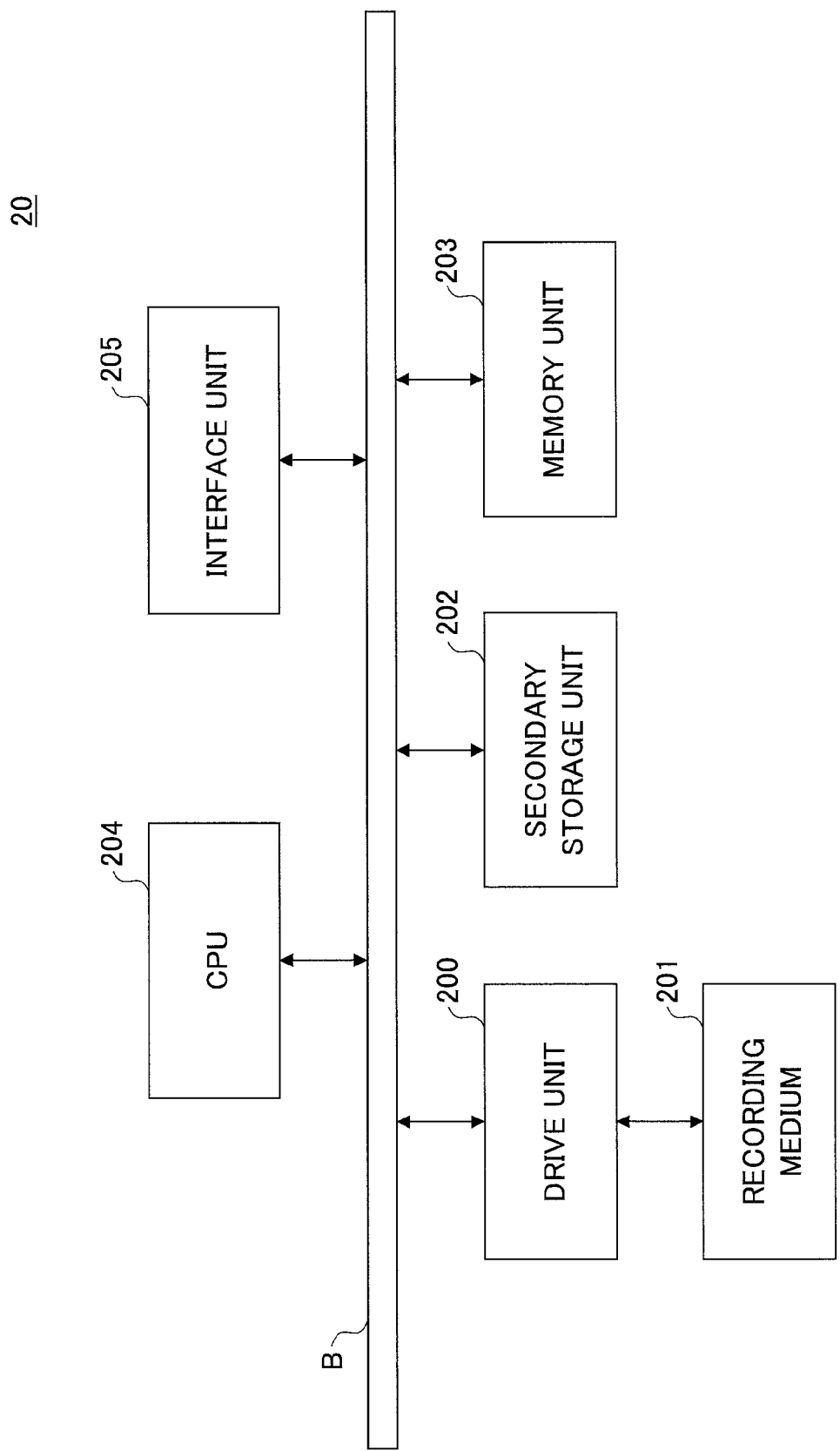
FIG. 2 is a diagram illustrating a hardware configuration of a service providing apparatus according to the first embodiment.

FIG. 2 is a diagram illustrating a hardware configuration of a service providing apparatus according to the first embodiment. Referring to FIG. 2, the service providing apparatus 20 includes a drive unit 200, a secondary storage unit 202, a memory unit 203, a central processing unit (CPU) 204, and an interface (I/F) unit 205, all of which are interconnected by a bus B.

A program that implements processes in the service providing apparatus 20 is provided by way of a recording medium 201 such as a CD-ROM. When the recording medium 201 storing a program is loaded into the drive unit 200, the program is installed in the secondary storage unit 202 from the recording medium 201 via the drive unit 200. The program, however, does not necessarily have to be installed from the recording medium 201, and may be downloaded from other computers via a network. The secondary storage unit 202 stores not only installed programs but also files and data.

The memory unit 203 reads a program from the secondary storage unit 202 and stores the read program in response to an instruction to activate the program. The CPU 204 executes functions pertaining to the service providing apparatus 20 in accordance with a program stored in the memory unit 203. The interface unit 205 is used as an interface for connecting to a network.

The service providing apparatus 20 may be formed of multiple computers each having the hardware as illustrated in FIG. 2. That is, the processes executed by the service providing apparatus 20 in the following description may be distributed among and executed by multiple computers.

Figure 3:
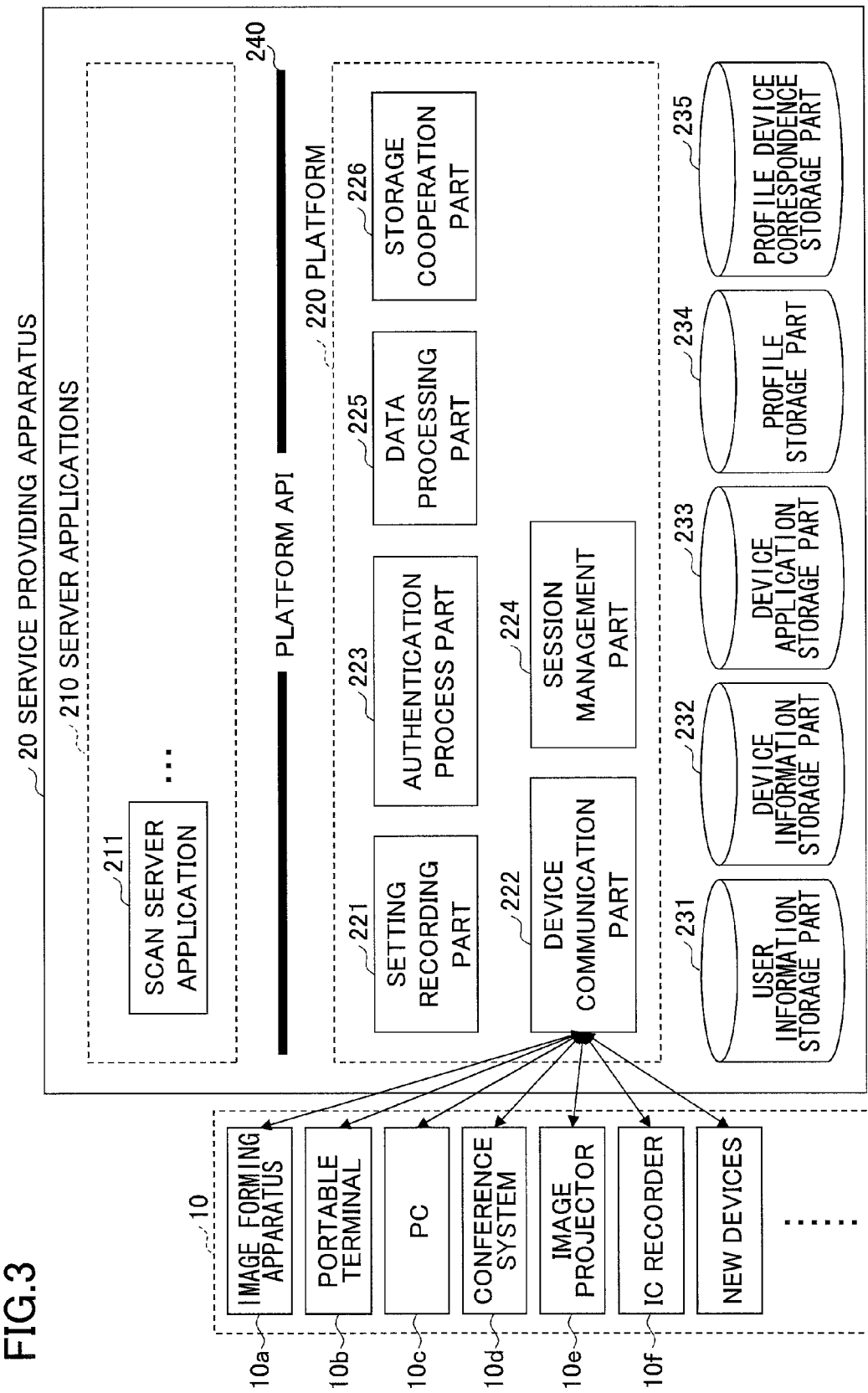
FIG. 3 is a diagram illustrating a functional configuration of a service providing apparatus according to the first embodiment.

FIG. 3 is a diagram illustrating a functional configuration of a service providing apparatus according to the first embodiment.

Referring to FIG. 3, the service providing apparatus 20 includes software including server applications 210 and a platform 220, which are composed of one or more programs installed in the service providing apparatus 20 and cause the CPU 204 to execute predetermined processes.

The service providing apparatus 20 uses a user information storage part 231, a device information storage part 232, a device application storage part 233, a profile storage part 234, and a profile device correspondence storage part 235. These storage parts 231 through 235 may be implemented using the secondary storage unit 202 or a storage unit connected to the service providing apparatus 20 via a network.

The server applications 210 are application programs that implement services provided by the service providing apparatus 20. It is assumed, however, that any one of the server applications 210 alone does not provide a complete service. The services are completed by the cooperation of the server applications 210 with the device 10. Furthermore, there are other services that are completed by cooperation with other cloud services or the like such as an online storage. The term "server applications" is used for convenience purposes to distinguish application programs on the service providing apparatus 20 side from application programs (for example, a distribution extension application 1222 described below) that have to be installed on the device 10 side for cooperation with the server applications 210.

In FIG. 3, a scan server application 211 is illustrated as an example of the server applications 210. The scan server application 211 is one of the server applications 210 that executes processes related to a scan-to-storage service.

The platform 220 includes functions common to the server applications 210 or basic functions used by the server applications 210. Referring to FIG. 3, the platform 220 includes a setting recording part 221, a device communication part 222, an authentication process part 223, a session management part 224, a data processing part 225, and a storage cooperation part 226. The functions of these parts 221 through 226 are open to the server applications 210 via a platform API 240. In other words, the server applications 210 may use the functions of these parts 221 through 226 to the extent that the functions are made open by the platform API 240.

The setting recording part 221 executes a setting recording process that is required at the start of use of a service provided by the service providing apparatus 20, such as a scan-to-storage service. The setting recording part 221 records information in the user information storage part 231 and the device information storage part 232.

The user information storage part 231 stores information on users of services provided by the service providing apparatus 20. The device information storage part 232 stores information on the device 10 caused to cooperate with a service provided by the service providing apparatus 20 in the system environment of a user (that is, the user environment E1).

The device communication part 222 controls communications with the device 10. In FIG. 3, an image forming apparatus 10*a* such as a multifunction machine, a copier, a facsimile (FAX) machine or a printer, a portable terminal 10*b*, a PC 10*c*, a conference system 10*d*, an image projector 10*e*, an IC recorder 10*f*, and other new devices that use device cooperation services are illustrated as examples of the device 10. As illustrated in FIG. 3, the device 10 that is able to communicate with the device communication part 222 is not limited to the image forming apparatus 10*a*. For example, data read by a scanning application of the portable terminal 10*b* such as a smartphone, or image data captured by the data input function of the other new devices may be transmitted to the service providing apparatus 20. The authentication process part 223 authenticates a user of the device 10. Furthermore, the authentication process part 223 executes a process of logging on to the online storage system 40 by proxy at the time of execution of a scan-to-storage service, for example. The session management part 224 manages sessions of communications between the service providing apparatus 20 and the device 10 at the time of the cooperation of the service providing apparatus 20 and the device 10.

The data processing part 225 processes data transmitted from the device 10. For example, the data processing part 225 executes an optical character recognition (OCR) process and a data format conversion process. The data processing part 225, which is illustrated in a single block in FIG. 3, may also be divided into multiple processing parts depending on the type of processing.

The storage cooperation part 226 performs cooperation with the online storage system 40.

The form of classification of software items and storage parts illustrated in FIG. 3 is an example, and the software items and the storage parts of the service providing apparatus 20 do not have to be hierarchically classified as illustrated in FIG. 3 in order to implement this embodiment. That is, the hierarchical relationship between software and storage parts in the service providing apparatus 20 is not limited in particular as long as it is possible for the device 10 and the like to cooperate with the server applications 210.

Figure 4:
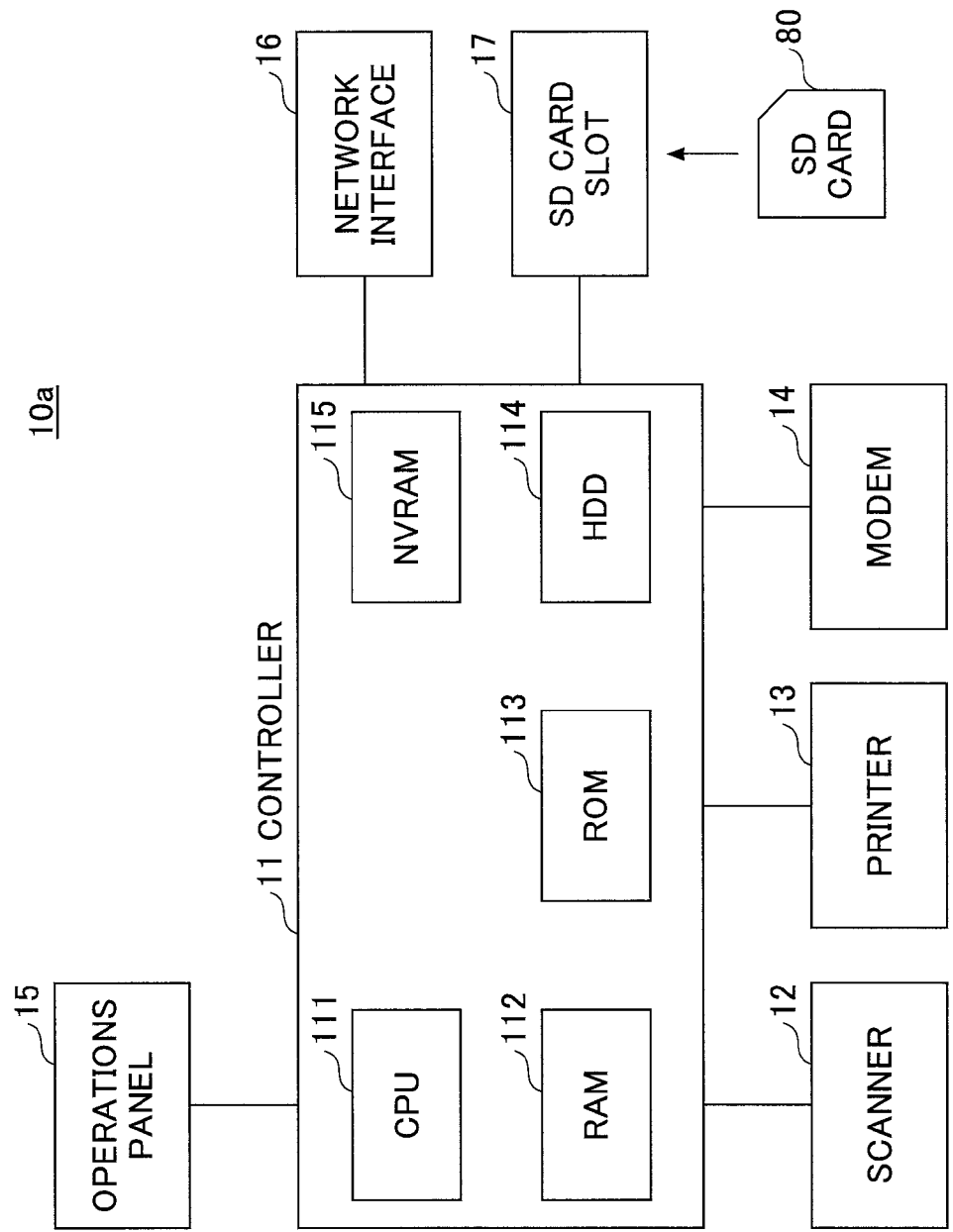
FIG. 4 is a diagram illustrating a hardware configuration of an image forming apparatus, which is an example of a device according to the first embodiment.

FIG. 4 is a diagram illustrating a hardware configuration of an image forming apparatus, which is an example of the device according to the first embodiment. Referring to FIG. 4, the image forming apparatus 10*a* includes hardware items such as a controller 11, a scanner 12, a printer 13, a modem 14, an operations panel 15, a network interface 16, and an SD card slot 17.

The controller 11 includes a CPU 111, a random access memory (RAM) 112, a read-only memory (ROM) 113, a hard disk drive (HDD) 114, and a nonvolatile RAM (NVRAM) 115. The ROM 113 contains various programs and data used by the programs. The RAM 112 is used as a storage area for loading a program and as a work area for the loaded program. The CPU 111 implements various functions by executing a program loaded into the RAM 112. The HDD 114 contains programs and various data used by the programs. The NVRAM 115 contains various kinds of configuration information.

The scanner 12 is a hardware item (an image reading part) that reads image data from an original material such as a document. The printer 13 is a hardware item (a printing part) that prints print data on a recording medium such as printing paper. The modem 14 is a hardware item for connecting to a telephone line, and is used for transmission and reception of image data through FAX communications. The operations panel 15 is a hardware item that includes an input part for receiving a user's input, such as a button, and a display part such as a liquid crystal panel. The network interface 16 is a hardware item for connecting to a network (either wired or wireless) such as a LAN. The SD card slot 17 is used to read a program stored in an SD card 80. That is, according to the image forming apparatus 10*a*, a program stored in the SD card 80 as well as a program stored in the ROM 113 may be loaded into the RAM 112 and executed. The SD card 80 may be replaced with other recording media (such as a CD-ROM and a universal serial bus (USB) memory). That is, a recording medium corresponding to the position of the SD card 80 is not limited to a predetermined kind. In this case, the SD card slot 17 may be replaced with a hardware item corresponding to the kind of recording medium that replaces the SD card 80.

Figure 5:
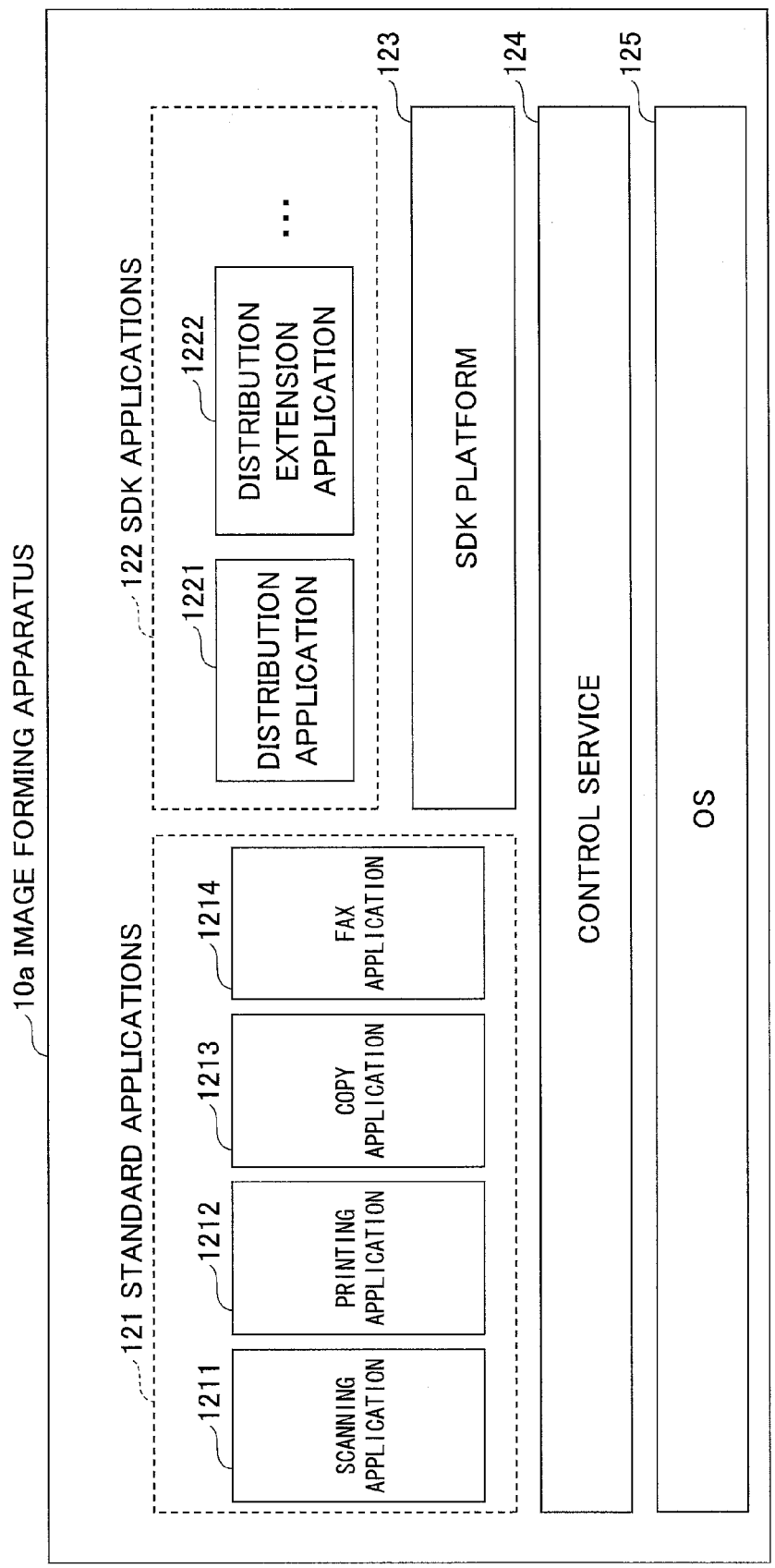
FIG. 5 is a diagram illustrating a functional configuration of an image forming apparatus according to the first embodiment.

FIG. 5 is a diagram illustrating a functional configuration of an image forming apparatus according to the first embodiment. Referring to FIG. 5, the image forming apparatus 10*a* includes standard applications 121, software development kit (SDK) applications 122, an SDK platform 123, a control service 124, and an operating system (OS) 125.

The standard applications 121 are a group of applications that are normally installed (that is, installed in advance at the time of shipment) in the image forming apparatus 10*a*. In FIG. 5, a scanning application 1211, a printing application 1212, a copy application 1213, and a FAX application 1214 are illustrated by way of example. The scanning application 1211 executes a scan job using the scanner 12. The printing application 1212 executes a print job using the printer 13. The copy application 1213 executes a copy job using the scanner 12 and the printer 13. The FAX application 1214 executes a FAX transmission or reception job using the modem 14. The control service 124 is a group of software modules that provides a higher level application with functions for controlling various kinds of hardware resources. The control service 124 includes, for example, a function pertaining to network communications, a function to control the scanner 12, a function to control the printer 13, and a function to manage memory devices (such as the RAM 112, the ROM 113, and the NVRAM 115).

The SDK applications 122 are application programs that are additionally installed in the image forming apparatus 10*a* to extend its functions after the shipment of the image forming apparatus 10*a* (also called "plug-ins"). In FIG. 5, a distribution application 1221 and the distribution extension application 1222 are illustrated as examples of the SDK applications 122.

The distribution application 1221 is one of the SDK applications 122 that causes the image forming apparatus 10*a* to scan an original material and transmit scanned image data to a predetermined transmission destination. The transmission destination of the image data is identified by information that indicates a transmission destination set as configuration information with respect to the distribution application 1221. For example, it is assumed that a folder of the file server 30 may be set as a transmission destination with respect to the distribution application 1221. In other words, it is assumed that the transmission destination to which the distribution application 1221 may transmit image data is the file server 30.

The distribution extension application 1222 is one of the SDK applications 122 for making it possible to extend the transmission destination of the image data caused to be scanned by the distribution application 1221 to a destination other than the file server 30 (a transmission destination to which the distribution application 1221 is unable to transmit image data). For example, the distribution extension application 1222 makes it possible to cause the image data caused to be scanned by the distribution application 1221 to be input data of a scan-to-storage service.

The distribution extension application 1222 is installed in the image forming apparatus 10a in which the distribution application 1221 has been installed in order to extend the transmission destination of image data of the distribution application 1221.

The SDK platform 123 includes an application program interface (API) for developing the SDK applications 122 and provides an environment for executing the SDK applications 122. The form of API may be, for example, either a function or a class and a method of the class of object-orientation. Hereinafter, an API provided by the SDK platform 123 is referred to as "SDKAPI." For example, the SDK platform 123 provides the SDK applications 122 with SDKAPIs such as an SDKAPI pertaining to a scanning function, an SDKAPI pertaining to a printing function, an SDKAPI pertaining to a copy function, and an SDKAPI pertaining to communications. The SDKAPIs are open, and third party vendors may develop the SDK applications 122. The SDK platform 123 may include a Java (registered trademark) virtual machine (VM) (hereinafter simply referred to as "JavaVM"). In this case, the SDK applications 122 are implemented by a Java (registered trademark) language.

The OS 125 is a so-called operating system. The software items in the image forming apparatus 10a run on the OS 125 as processes or threads.

Figure 6:
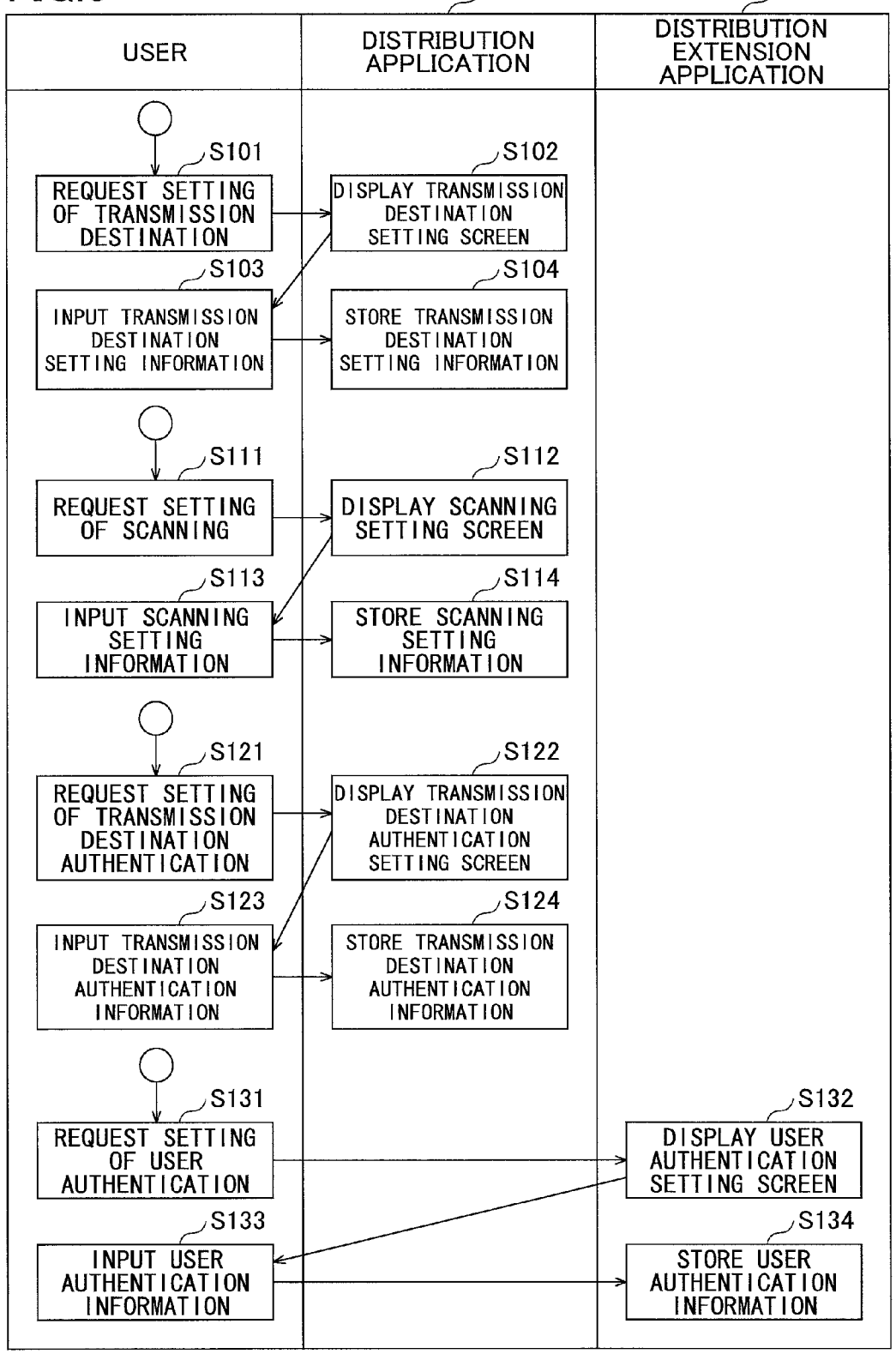
FIG. 6 is a flowchart for illustrating a procedure for a process of configuring initial settings with respect to a distribution application and a distribution extension application.

A description is given below of procedures for processes executed in the information processing system 1. FIG. 6 is a flowchart for illustrating a procedure for a process of configuring initial settings (an initial setting process) with respect to a distribution application and a distribution extension application. The initial setting process is a process of configuring setting information that needs to be configured (set) with respect to the distribution application 1221 and the distribution extension application 1222 before use of the distribution application 1221 and the distribution extension application 1222. Although omitted in FIG. 6, it is assumed that a user logs on to the image forming apparatus 10a before step S101. In the following description, a process that is described as being executed by the distribution application 1221 or the distribution extension application 1222 is technically a process that the distribution application 1221 or the distribution extension application 1222 causes the image forming apparatus 10a to execute.

At steps S101 through S104, settings pertaining to a transmission destination of image data scanned by the distribution application 1221 (hereinafter referred to as "scanned image") are configured. At step S101, a user inputs a request to configure settings of a transmission destination of the scanned image through the operations panel 15 (FIG. 4). In response to the request, at step S102, the distribution application 1221 causes a transmission destination setting screen to be displayed on the operations panel. At step S103, the distribution application 1221 receives the settings of the IP address of the file server 30 and a folder name in the file server 30 through the transmission destination setting screen. If the distribution application 1221 is configured to transmit the scanned image by electronic mail (e-mail), the e-mail address of a transmission destination may be set on the transmission destination setting screen. Hereinafter, the information set on the transmission destination setting screen is referred to as "transmission destination setting information."

Next, at step S104, the distribution application 1221 stores the set transmission destination setting information in, for example, the NVRAM 115 or the HDD 114 (FIG. 4) in correlation with the identification information of the user that has logged on to the image forming apparatus 10a (hereinafter referred to as "logon username").

At steps S111 through S114, settings pertaining to scanning by the distribution application 1221 are configured. At step S111, the user inputs a request to configure settings of scanning through the operations panel 15. In response to the request, at step S112, the distribution application 1221 causes a scanning setting screen to be displayed on the operations panel 15. At step S113, the distribution application 1221 receives the settings of attribute information pertaining to the scanning (reading) of an original material through the scanning setting screen. Hereinafter, the information set on the scanning setting screen is referred to as "scanning setting information." The scanning setting information includes, for example, setting values for settings such as resolution, paper size, and color mode (monochrome or color).

Next, at step S114, the distribution application 1221 stores the set scanning setting information in, for example, the NVRAM 115 or the HDD 114 in correlation with the logon username.

At steps S121 through S124, authentication information with respect to the transmission destination of the scanned image scanned by the distribution application 1221 is set. At step S121, the user inputs a request to set authentication information with respect to the transmission destination through the operations panel 15. In response to the request, at step S122, the distribution application 1221 causes a transmission destination authentication setting screen to be displayed on the operations panel 15. At step S123, the distribution application 1221 receives the settings of authentication information with respect to the transmission destination through the transmission destination authentication setting screen. Hereinafter, the information set on the transmission destination authentication setting screen is referred to as "transmission destination authentication information." The transmission destination authentication information includes, for example, a username and a password that need to be presented to the file server 30 in order to access a folder related to the transmission destination setting information.

Next, at step S124, the distribution application 1221 stores the set transmission destination authentication information in, for example, the NVRAM 115 or the HDD 114 in correlation with the logon username.

The setting of the transmission destination setting information (S101 through S104), the setting of the scanning setting information (S111 through S114), and the setting of the transmission destination authentication information (S121 through S124) do not necessarily have to be successively performed.

At steps S131 through S134, settings with respect to the distribution extension application 1222 are configured. Accordingly, step S131 and the subsequent steps are executed after installation of the distribution extension application 1222. For example, in the image forming apparatus 10a, when steps S131 through S134 are executed with the distribution application 1221 being already in use, usually, a distribution process by the distribution application 1221 has been executed between steps S101 through S124 and steps S131 through S134.

At step S131, the user inputs a request to set authentication information with respect to the service providing apparatus 20 through the operations panel 15. In response, at step S132, the distribution extension application 1222 causes a cloud authentication setting screen to be displayed on the operations panel 15. At step S133, the distribution extension application 1222 receives the settings of authentication information with respect to the service providing apparatus 20 through the cloud authentication setting screen. Hereinafter, the information set on the cloud authentication setting screen is referred to as "cloud authentication information." The cloud authentication information includes, for example, the identification information of the machine body of the image forming apparatus 10a (hereinafter referred to as "machine number") and the account information (username and password) of a user registered in advance with the service providing apparatus 20. In this embodiment, the cloud authentication information includes the machine number because the service providing apparatus 20 requests the machine number of the device 10 to be presented along with the username and password in the case of logging on to the service providing apparatus 20 from the device 10.

Next, at step S134, the distribution extension application 1222 stores the set cloud authentication information in, for example, the NVRAM 115 or the HDD 114 in correlation with the logon username.

Thereby, the initial settings with respect to the distribution application 1221 and the distribution extension application 1222 are completed. In FIG. 6, the setting process with respect to the distribution application 1221 (S101 through S124) and the setting process with respect to the distribution extension application 1222 (S131 through S134) appear to be successively executed. As mentioned above, however, there may be a long time lag between the two setting processes.

In the case where the distribution application 1221 is used by multiple users, steps S101 through S134 may be executed user by user or may be executed for all the users at one time. In the case of executing steps S101 through S134 for all the users at one time, various kinds of setting information may be set user by user on each setting screen. The various kinds of setting information may be stored in correlation with a username set on each setting screen instead of the logon username.

Alternatively, a single common setting information item may be set for multiple users.

Figure 7:
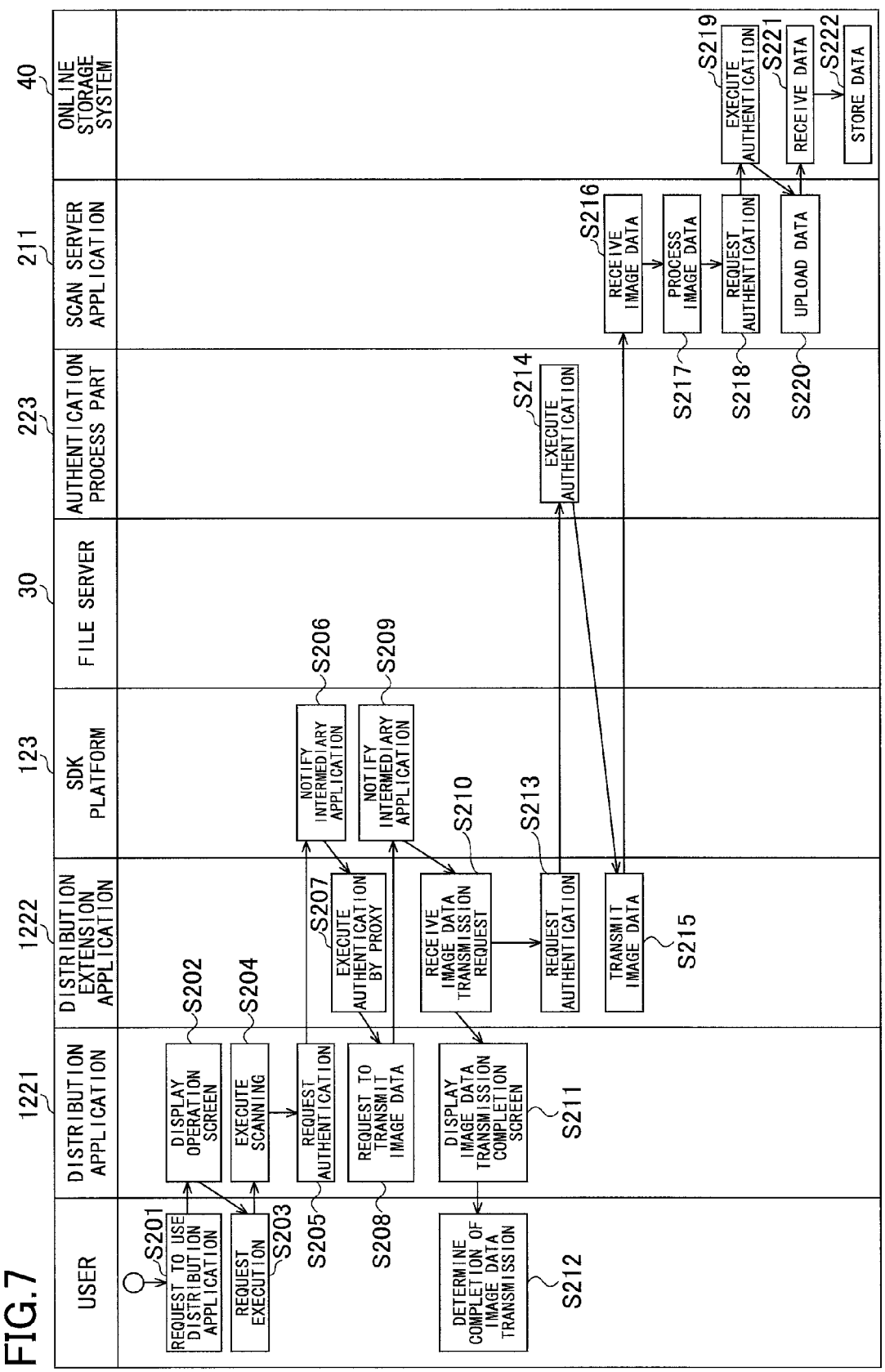
FIG. 7 is a diagram for illustrating a procedure for a process of transmitting a scanned image according to the first embodiment.

Next, a description is given of a process executed at the time of use of the distribution application 1221. FIG. 7 is a diagram for illustrating a procedure for a process of transmitting a scanned image according to the first embodiment. Although omitted in FIG. 7, it is assumed that a user logs on to the image forming apparatus 10a before step S201.

At step S201, a user inputs a request to use the distribution application 1221 through the operations panel 15. In response to the request, at step S202, the distribution application 1221 causes an operation screen of the distribution application 1221 to be displayed on the operations panel 15. A message such as "PLEASE SET ORIGINAL MATERIAL" may be displayed on the operation screen.

At step S203, an original material to be scanned is set, and an instruction to execute a job is input through the operation screen or a hard key such as a START key of the operations panel 15. In response, at step S204, the distribution application 1221 controls the scanner 12 through the SDK platform 123 and the control service 124 to cause the scanner 12 to scan the original material. At this point, the distribution application 1221 causes scanning to be executed in a mode according to the scanning setting information stored in correlation with a logon username.

Next, at step S205, the distribution application 1221 inputs, to the SDK platform 123, a request to transmit an authentication request with respect to the transmission destination (for example, the file server 30) indicated by the transmission destination setting information stored in correlation with the logon username. The transmission destination authentication information stored in correlation with the logon username is specified in the authentication request.

In response to the transmission request, at step S206, the SDK platform 123 notifies the distribution extension application 1222 of the authentication request, along with the transmission destination setting information and the transmission destination authentication information, instead of transmitting the authentication request to the transmission destination indicated by the transmission destination setting information. That is, execution of a process according to the authentication request is delegated to the distribution extension application 1222. The notification may be either the calling of a function or the transmission of the authentication request to the port of the socket created by the distribution extension application 1222.

At step S207, the distribution extension application 1222 transmits the authentication request of which the distribution extension application 1222 has been notified to the transmission destination indicated by the transmission destination setting information. That is, the distribution extension application 1222 processes the authentication request by proxy. At step S207 as well, the same request as at step S205 is made to the SDK platform 123. At this time, however, the SDK platform 123 transmits the authentication request. That is, when the SDK platform 123 receives a request to communicate an authentication request or the like from the distribution application 1221, the SDK platform notifies the distribution extension application 1222 of the received request. When the SDK platform 123 receives a communication request from the distribution extension application 1222, the SDK platform 123 performs the requested communication. The SDK platform 123 may determine whether the requestor is the distribution application 1221 or the distribution extension application 1222 based on, for example, the attribute of the thread of the requestor.

In the case of success in the authentication by proxy, the distribution extension application 1222 returns a response indicating authentication success to the SDK platform 123. The SDK platform 123 returns a response indicating authentication success to the distribution application 1221. In FIG. 7, an arrow is drawn from step S207 to step S208. Technically, however, a response is returned in a direction opposite to the direction of transmission of the authentication request. Accordingly, it appears to the distribution application 1221 as if the transmission of the authentication request that has been requested by the distribution application 1221 had been performed by the SDK platform 123.

When the authentication succeeds, at step S208, the distribution application 1221 inputs, to the SDK platform 123, a request to transmit the scanned image scanned from the original material at step S204. The transmission destination setting information stored in correlation with the logon username is specified in the transmission request.

As described above, the SDK platform 123 notifies the distribution extension application 1222 of a communication request from the distribution application 1221. Accordingly, at step S209, the SDK platform 123 notifies the distribution extension application 1222 of the request to transmit the scanned image as well. That is, execution of a process with respect to the request to transmit the scanned image is delegated to the distribution extension application 1222.

At step S210, when the distribution extension application 1222 receives the notification of the request to transmit the scanned image, the distribution extension application 1222 returns a response to the SDK platform 123 before transmission of the scanned image. In response to the response, the SDK platform 123 returns a response to the request to transmit the scanned image to the distribution application 1221. That is, while an arrow is drawn from step S210 to step S211 in FIG. 7, technically, a response is returned in a direction opposite to the direction of transmission of the request to transmit the scanned image. Accordingly, it appears to the distribution application 1221 as if the transmission of the scanned image that has been requested by the distribution application 1221 had been performed by the SDK platform 123.

Then, at step S211, the distribution application 1221 causes a screen reporting completion of the transmission of the scanned image to be displayed on the operations panel 15. At step S212, the user determines that the scanned image has been transmitted, referring to the screen.

On the other hand, the distribution extension application 1222 executes a process according to the request to transmit the scanned image received at step S210. First, at step S213, the distribution extension application 1222 transmits an authentication request to the service providing apparatus 20. The cloud authentication information (machine number, username, password, etc.) stored in correlation with the logon username is specified in the authentication request. At step S214, the authentication process part 223 (FIG. 3) of the service providing apparatus 20 executes an authentication process in response to the authentication request. For example, the authentication succeeds when the combination of the specified username and password is stored in the user information storage part 231 (FIG. 3) and the specified machine number is stored in the device information storage part 232 in correlation with the username. When the authentication succeeds, the username specified in the authentication request is correlated with a session with the image forming apparatus 10a as a logon username in the service providing apparatus 20. Accordingly, thereafter, a logon username corresponding to a request received from the image forming apparatus 10a may be determined from the session related to the requestor.

In the case of authentication success, at step S215, the distribution extension application 1222 transmits the scanned image to the service providing apparatus 20. At step S216, the scan server application 211 (FIG. 3) of the service providing apparatus 20 receives the scanned image, and determines a process to be executed with respect to the scanned image, referring to, for example, the user information storage part 231.

FIG. 8 is a diagram illustrating a configuration of a user information storage part. Referring to FIG. 8, the user information storage part 231 stores a username, a password, process information, transmission destination information, etc., with respect to each user. The process information is information indicating the contents of a process to be executed with respect to a received scanned image. In FIG. 8, "OCR" is recorded as the process information with respect to a user aaa. This indicates that an OCR (optical character recognition) process is to be executed with respect to a scanned image from the user aaa. The process information may include setting information with respect to the process to be executed. Furthermore, the process information of multiple processes and information on the order of execution of the multiple processes may be set in the process information. The transmission destination information is information pertaining to the transmission destination of data output by the process indicated by the process information. For example, the transmission destination information includes the identification information of the online storage system 40 (hereinafter referred to as "storage identification information") and account information with respect to the online storage system 40.

The process information may not be set. In this case, a received scanned image is directly transmitted to the transmission destination indicated by the transmission destination information.

When process information is recorded with respect to the user related to the logon username, at step S217, the scan server application 211 causes the data processing part 225 (FIG. 3) to execute the process indicated by the process information on the scanned image. For example, when the OCR process is executed on the scanned image, text data are output from the data processing part 225.

Next, the scan server application 211 requests the storage cooperation part 226 (FIG. 3) to upload the data of the result of processing by the data processing part 225 or the scanned image in the absence of process information (hereinafter referred to as "upload data") to the online storage system 40. In the request, the transmission destination information stored in the user information storage part 231 is specified in correlation with the logon username in the service providing apparatus 20.

At step S218, the storage cooperation part 226 transmits an authentication request to the online storage system 40 related to the storage identification information included in the transmission destination information, specifying the account information included in the transmission destination information. At step S219, the online storage system 40 executes an authentication process in response to the authentication request.

When the authentication succeeds, at step S220, the storage cooperation part 226 uploads (transmits) the upload data to the online storage system 40. At this point, the identification information of a storage destination of the upload data, such as a folder name, may be specified. The identification information may be included in the transmission destination information. At step S221, the online storage system 40 receives the upload data, and at step S222, the online storage system 40 stores the upload data in, for example, the specified storage destination.

As described above, according to the first embodiment, the scanned image, which the distribution application 1221 had intended to transmit to the file server 30, is transmitted to the service providing apparatus 20 by the distribution extension application 1222. Furthermore, the scanned image or data based on the scanned image are uploaded to the online storage system 40 by the service providing apparatus 20. Accordingly, it is possible to substantially extend the range of transmission destinations of image data of the distribution application 1221 without altering the source code of the distribution application 1221.

The processes of step S206 and step S209 may also be implemented without altering the source code of the SDK platform 123. For example, when the SDK platform 123 includes an extension point with respect to an SDKAPI that receives a communication request, a process that executes the processes of step S206 and step S209 may be defined with respect to the extension point in implementing the distribution extension application 1222. This makes it possible to cause the SDK platform 123 to execute step S206 and step S209 by installing the distribution extension application 1222 without altering the source code of the SDK platform 123.

Here, for example, when a program having a function of a predetermined name is installed, the extension point refers to a part that is implemented to call the function. Alternatively, in the case of implementation by object-oriented programming, an inheritable class may be the extension point. That is, steps S206 and S209 may be implemented by the overriding of a method by subclassing.

Furthermore, steps S206 and S209 may also be executed by a JavaVM in the SDK platform 123. That is, a communication request received by the SDK platform 123 is ultimately transmitted to a method for communications possessed by the JavaVM. In the JavaVM as well, such a method may be overridden. Accordingly, by having the overriding of such a method implemented in the distribution extension application 1222, it is possible to implement steps S206 and S209 without altering the source code of the JavaVM.

If the SDK platform 123 delegates a process with respect to all requests to transmit a scanned image from the distribution application 1221 to the distribution extension application 1222 at step S209, it may become difficult to use a function that is implementable before installation of the distribution extension application 1222. For example, the file server 30 is prevented from being set as a transmission destination of a scanned image. Therefore, at step S209, the SDK platform 123 may notify the distribution extension application 1222 of a request to transmit a scanned image only when a predetermined keyword (for example, "cloud") is included in the character string of address information that indicates a transmission destination in the transmission destination setting information. When a predetermined keyword (character string) is not included in the character string, the SDK platform 123 may transmit the scanned image to the transmission destination indicated by the transmission destination setting information. This makes it possible to cooperate with the service providing apparatus 20 with a function available before installation of the distribution extension application 1222 remaining available. The predetermined keyword may alternatively be included with respect to, for example, a folder name.

Even when a predetermined keyword is included in the transmission destination setting information, it is not necessary to alter the distribution application 1221. This is because a character string set in the transmission destination setting information, in which the transmission destination is desired to be changed to the service providing apparatus 20, may be altered and the logic of a process executed by the distribution application 1221 does not have to be altered.

At step S206 as well, the SDK platform 123 may delegate execution of a process according to the authentication request to the distribution extension application 1222 only when information indicating the transmission destination of the authentication request is predetermined address information (the address information of the file server 30 in this embodiment).

Next, a description is given of a second embodiment. In the second embodiment, a description is given of differences from the first embodiment. Accordingly, the second embodiment may be the same as the first embodiment with respect to the points not mentioned in particular.

Figure 9:
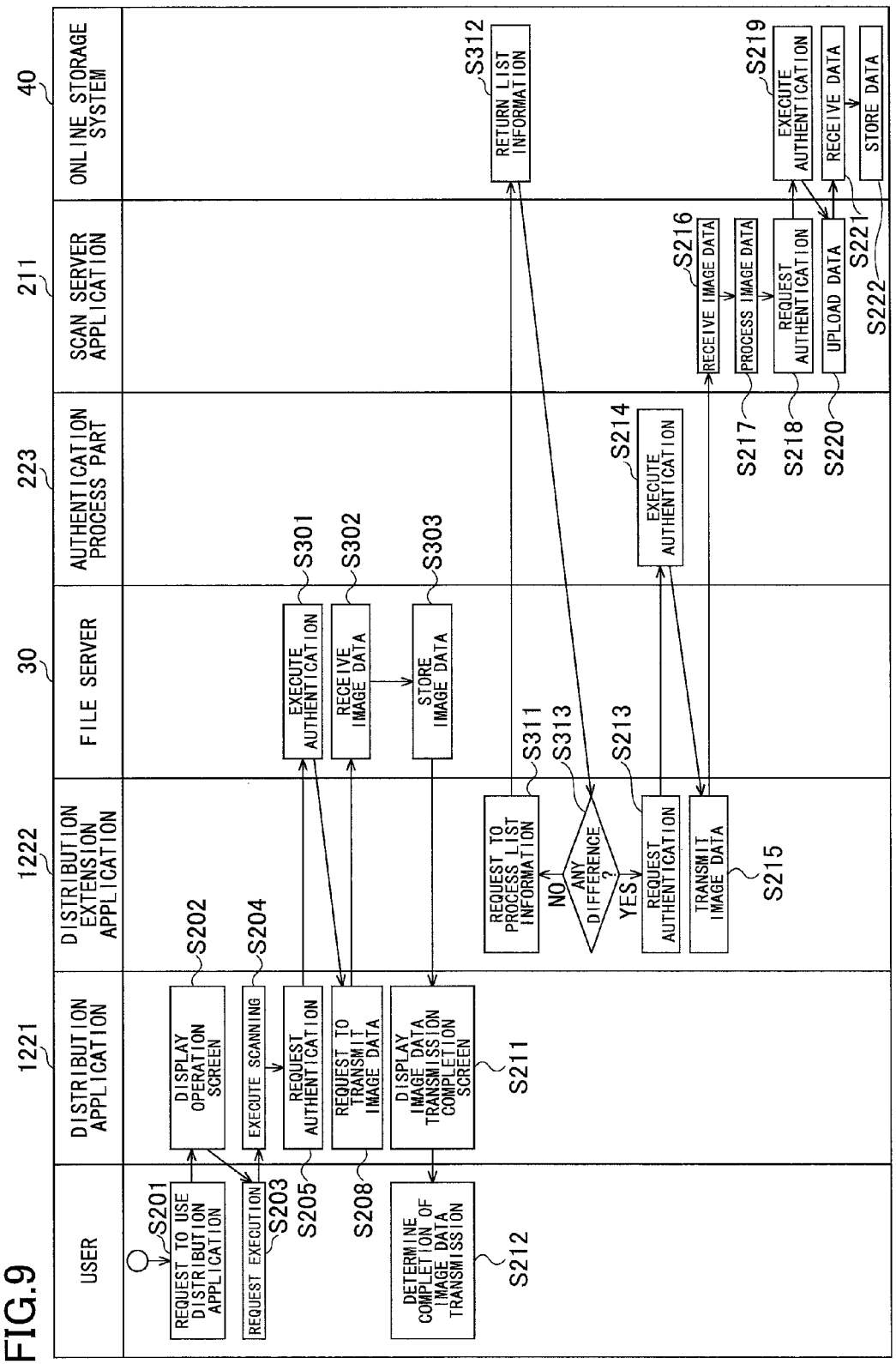
FIG. 9 is a diagram illustrating a procedure for a process of transmitting a scanned image according to a second embodiment.

FIG. 9 is a diagram illustrating a procedure for a process of transmitting a scanned image according to the second embodiment. That is, in the second embodiment, the procedure illustrated in FIG. 7 is replaced with the procedure illustrated in FIG. 9. In FIG. 9, the same steps as those in FIG. 7 are referred to by the same step numbers and their description is omitted.

In the second embodiment, the authentication request by the distribution application 1221 at step S205 is transmitted to the transmission destination specified in the authentication request (for example, the file server 30) without being transferred to the distribution extension application 1222. Although omitted in FIG. 9, the transmission of the authentication request is performed by the SDK platform 123. At step S301, the file server 30 executes an authentication process with respect to the transmission destination authentication information specified in the authentication request, and returns the result of the authentication.

When the authentication succeeds, at step S208, the distribution application 1221 inputs, to the SDK platform 123, a request to transmit the scanned image scanned from the original material at step S204. The transmission request as well is not transferred to the distribution extension application 1222, and is normally processed by the SDK platform 123. Accordingly, the scanned image is transmitted to, for example, the file server 30. Information including the transmission destination setting information is transmitted to the file server 30 along with the scanned image.

At step S302, the file server 30 receives the scanned image. At step S303, the file server 30 stores the scanned image in the folder indicated by the transmission destination setting information. The file server 30 returns a response that indicates normal storage of the scanned image.

On the other hand, the distribution extension application 1222 periodically establishes synchronization of the stored contents between the file server 30 and the online storage system 40. In other words, according to the second embodiment, the same folder configuration (tree structure of a folder) as the folder configuration in the file server 30 is constructed in the online storage system 40, so that the same image data as the image data stored in folders in the file server 30 are stored in the same folders in the online storage system 40. That is, in the second embodiment, the stored contents of the file server 30 are mirrored in the online storage system 40.

For synchronization, at step S311, the distribution extension application 1222 periodically transmits, to the online storage system 40, a request to obtain a list of the bibliographic information of the image data stored in a folder configuration corresponding to the machine number of the image forming apparatus 10a or a logon username in the online storage system 40 (hereinafter referred to as "list information"). In response to reception of the obtaining request, at step S312, the online storage system 40 returns the list information of the image data stored in the folders included in the specified folder configuration to the distribution extension application 1222. The bibliographic information of the image data includes, for example, the filename of a file that contains the image data and the pathname of a folder in which the file is stored.

At step S313, the distribution extension application 1222 compares the returned list information and the list information of image data in the file server 30. At least, the list information of image data is also obtained from the file server 30 before step S313.

If there is no difference between the compared list information, step S213 and the subsequent steps are not executed. If there is a difference between the compared list information, step S213 and the subsequent steps are executed. In this case, at and after step S215, image data pertaining to the difference, that is, image data that are present in the file server 30 and absent in the online storage system 40, are determined as objects of processing.

As described above, according to the second embodiment, the scanned image that are transmitted to the file server 30 by the distribution application 1221 and stored in the file server 30 are transmitted to the service providing apparatus 20 by the distribution extension application 1222. Accordingly, it is possible to substantially extend the range of transmission destinations of image data of the distribution application 1221 without altering the source code of the distribution application 1221.

Next, a description is given of a third embodiment. In the third embodiment, a description is given of differences from the first or the second embodiment. Accordingly, the third embodiment may be the same as the first or the second embodiment with respect to the points not mentioned in particular.

Figure 10:
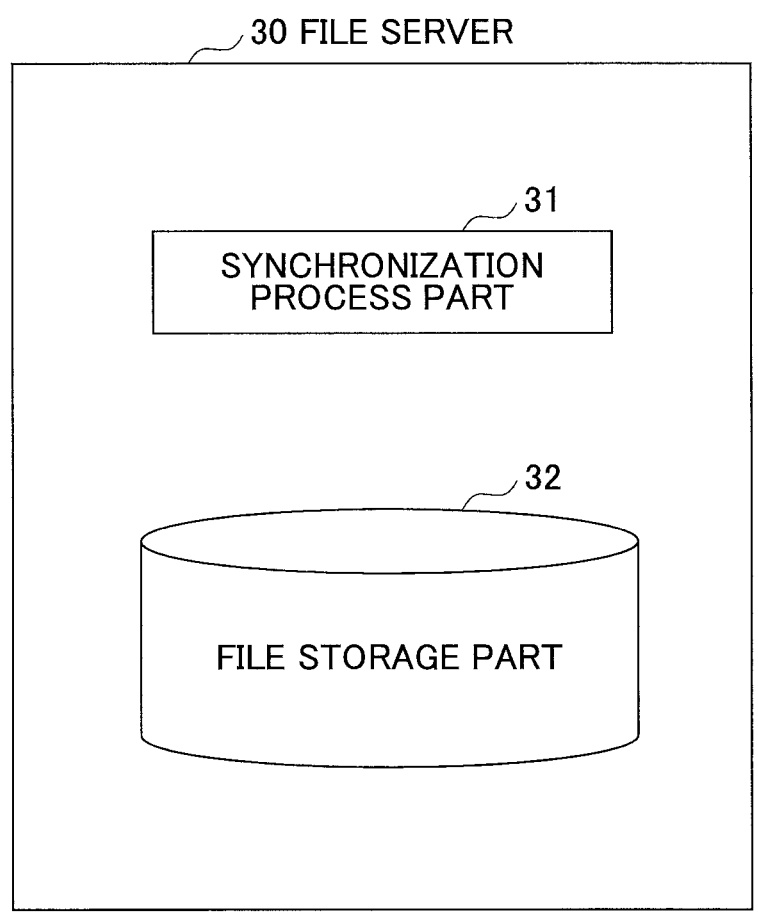
FIG. 10 is a diagram illustrating a functional configuration of a file server according to a third embodiment.

FIG. 10 is a diagram illustrating a functional configuration of a file server according to the third embodiment. Referring to FIG. 10, the file server 30 includes a synchronization process part 31 and a file storage part 32.

The file storage part 32 is a storage part that stores a file in which a scanned image is stored in each embodiment. That is, a scanned image is stored in a folder created in the file storage part 32 in the first or the second embodiment as well.

The synchronization process part 31 periodically establishes synchronization of the stored contents between the file server 30 and the online storage system 40. That is, according to the third embodiment as well, the stored contents of the file server 30 are mirrored in the online storage system 40. The synchronization process part 31 executes the same process as executed by the distribution extension application 1222 in the second embodiment. The synchronization process part 31 is implemented by a process that a program installed in the file server 30 causes the CPU of the file server 30 to execute.

Figure 11:
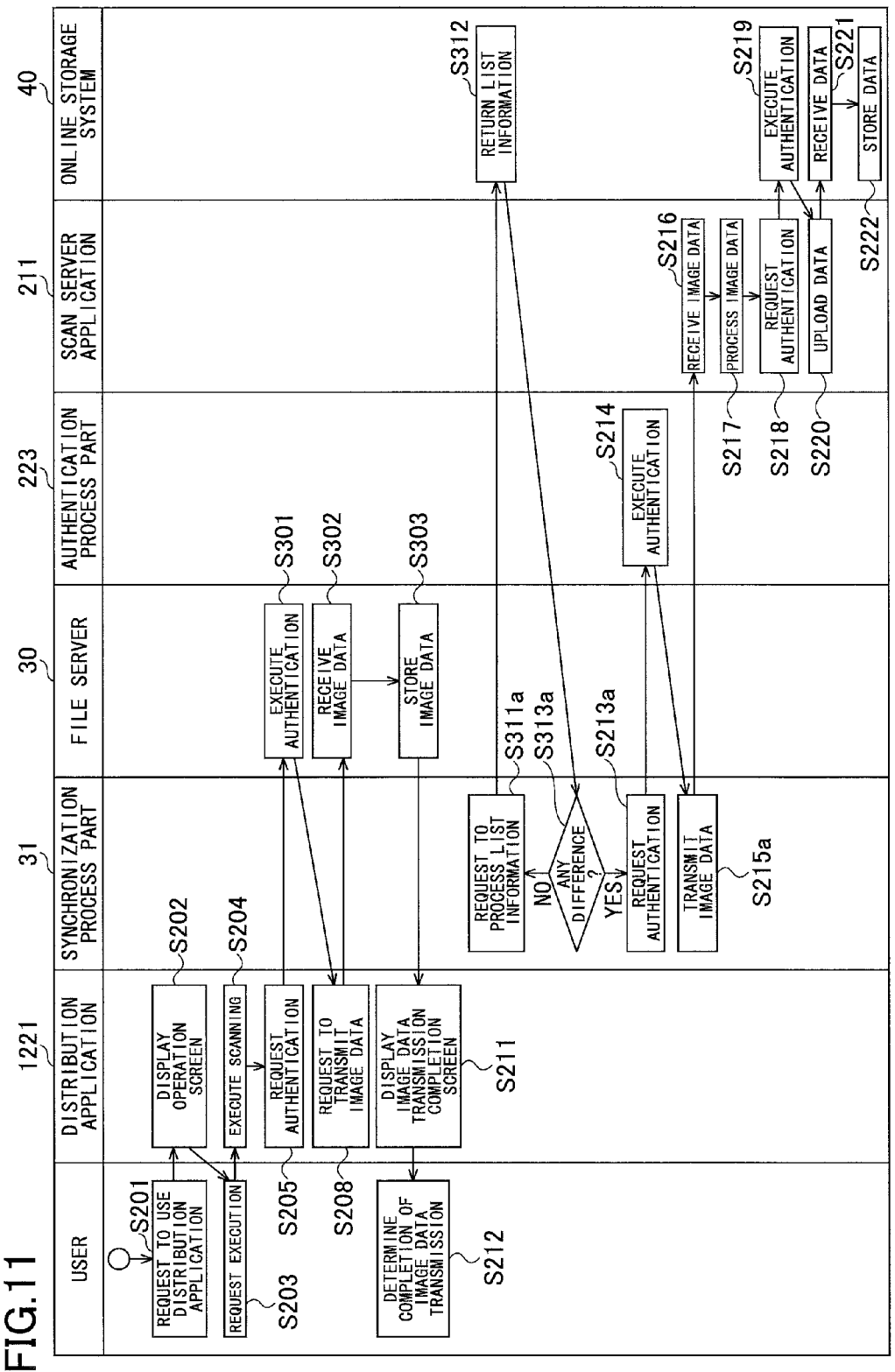
FIG. 11 is a diagram for illustrating a procedure for a process of transmitting a scanned image according to the third embodiment.

FIG. 11 is a diagram for illustrating a procedure for a process of transmitting a scanned image according to the third embodiment. That is, in the third embodiment, the procedure illustrated in FIG. 9 is replaced with the procedure illustrated in FIG. 11. In FIG. 11, the same steps as those in FIG. 9 are referred to by the same step numbers and their description is omitted.

In FIG. 11, the contents of the processes of steps S311a, S313a, S213a, and S215a are the same as the contents of the processes of steps S311, S313, S213, and S215 in FIG. 9. The third embodiment, however, is different from the second embodiment in that these steps are executed by the synchronization process part 31. Otherwise, the third embodiment may be the same as the second embodiment.

The synchronization process part 31 may alternatively be included in a computer (not graphically illustrated) other than the file server 30.

As described above, according to the third embodiment, the scanned image that is transmitted to the file server 30 by the distribution application 1221 and stored in the file server 30 is transmitted to the service providing apparatus 20 by the synchronization process part 31. Accordingly, it is possible to substantially extend the range of transmission destinations of image data of the distribution application 1221 without altering the source code of the distribution application 1221.

The service providing apparatus 20 may be configured using multiple computers. That is, the processes executed by the service providing apparatus 20 in each of the above-described embodiments may be distributed among and executed by multiple computers.

Figure 12:
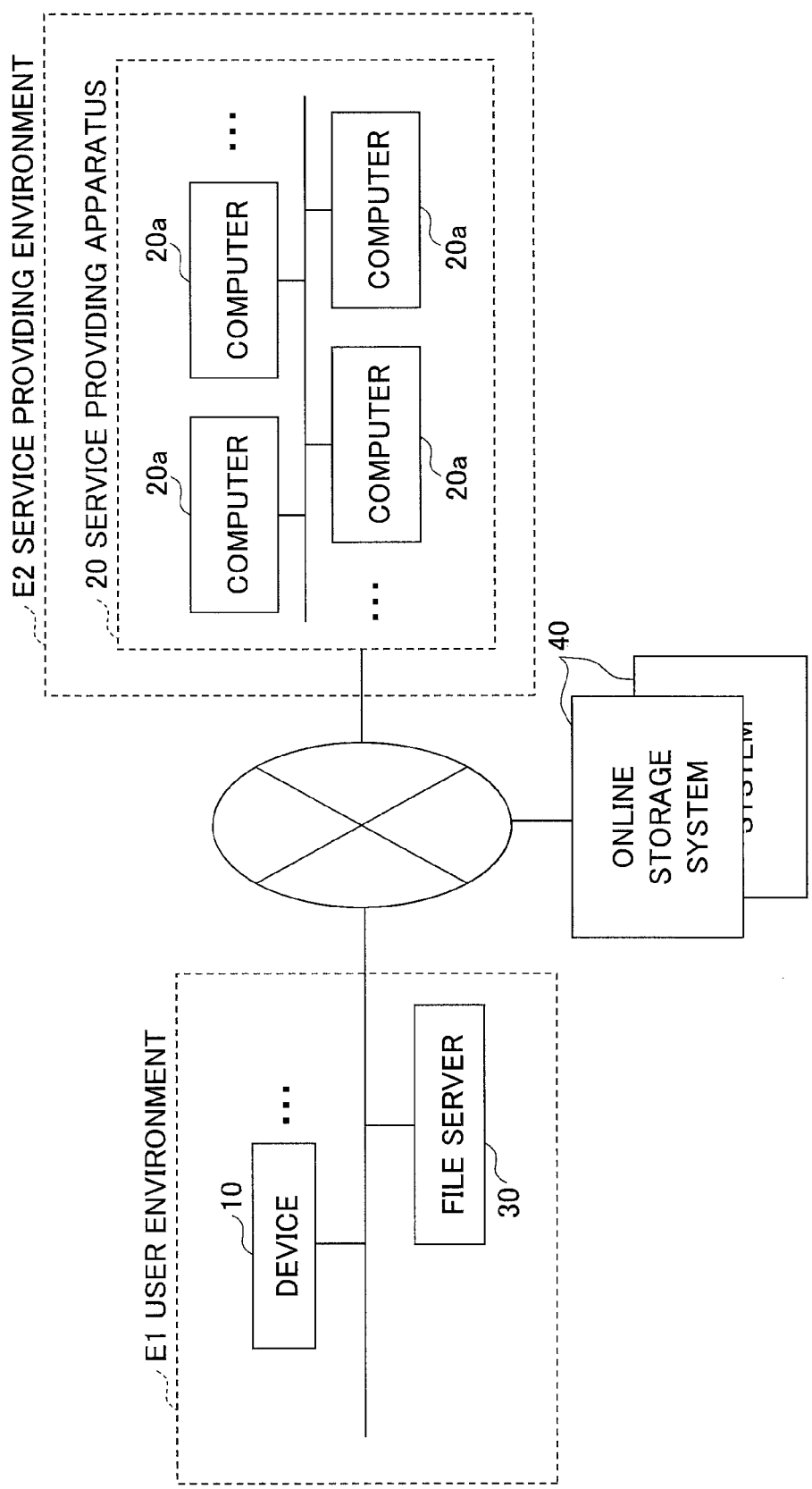
FIG. 12 is a diagram illustrating a case where a service providing apparatus is configured using multiple computers.

FIG. 12 is a diagram illustrating a case where a service providing apparatus is configured using multiple computers. Referring to FIG. 12, the service providing apparatus 20 is configured by being distributed among multiple computers 20a. The service providing apparatus 20, which is configured using four or more computers 20a in FIG. 12, may alternatively be configured using less than four computers 20a.

In the above-described embodiments, a description is given of the cases where the image forming apparatus 10a is employed as an example of the device 10. Embodiments of the present invention, however, may also be applied to devices other than the image forming apparatus 10a as long as the devices allow image data to be input to the devices. For example, a digital camera, a cellular phone with a digital camera, or an electronic blackboard may be used in place of the image forming apparatus 10a.

In the above-described embodiments, the scanner 12 is an example of an input part, the distribution application 1221 is an example of a first transmission part, the distribution extension application 1222 is an example of a second transmission part, and the SDK platform 123 is an example of a transmission control part.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A device, comprising:
a processor; and
a memory storing a plurality of application programs including a first application program and a second application program that are managed independent of each other, the first application program including instructions for causing the device to transmit data to a predetermined transmission destination, the second application program including instructions for causing the device to transmit the data to a transmission destination different from the predetermined transmission destination,
wherein the first application program, when executed by the processor, causes the device to
display a first screen;
receive a transmission request input on the displayed first screen, the transmission request including a request to transmit the data, the request to transmit the data specifying the predetermined transmission destination as a transmission destination of the data;
display a second screen indicating completion of transmission of the data requested by the transmission request in response to receiving the transmission request, the second screen being different from the first screen; and delegate execution of the transmission request to the second application program in response to receiving the transmission request, wherein the second application program, when executed by the processor, causes the device to execute the received transmission request to transmit the data to the transmission destination different from the predetermined transmission destination in response to the execution of the transmission request being delegated to the second application program, and wherein the first application program further causes the device to delegate execution of a request to execute a process related to a service provided via a network to the second application program, and the second application program causes the device to transmit the data to the transmission destination different from the predetermined transmission destination after executing the request to execute the process related to the service provided via the network, when the request to execute the process related to the service provided via the network is included in the transmission request whose execution is delegated to the second application program.

2. The device as claimed in claim 1,
wherein the transmission request includes information indicating the predetermined transmission destination, and
wherein the first application program further causes the device to determine whether a predetermined character string is included in the information indicating the predetermined transmission destination, and to delegate the execution of the transmission request to the second application program in response to determining that the predetermined character string is included in the information.

3. The device as claimed in claim 1, wherein the second application program causes the device to transmit the data to an information processing apparatus configured to execute a preset process on the transmitted data, in response to the execution of the transmission request being delegated to the second application program.

4. The device as claimed in claim 2,
wherein the first application program further causes the device to transmit the data to the predetermined transmission destination in response to determining that the predetermined character string is absent from the information.

5. The device as claimed in claim 1,
wherein the request to execute the process related to the service provided via the network is an authentication request for authentication of a user who logs on to the device,
wherein the second application program further causes the device to transmit the authentication request to the predetermined transmission destination, and
wherein the first application program causes the device to delegate the request to transmit the data to the second application program, in response to a success of the authentication of the user requested by the authentication request.

6. The device as claimed in claim 5, wherein the second application program further causes the device to transmit an additional authentication request for authentication of the user to the transmission destination different from the predetermined transmission destination in response to the execution of the transmission request being delegated to the second application program, and to transmit the data to the transmission destination different from the predetermined transmission destination in response to a success of the authentication of the user requested by the additional authentication request.

7. The device as claimed in claim 1,
wherein the first application program causes the device to transmit the data only to the predetermined transmission destination, and
wherein the second application program is installed in the device after installation of the first application program in the device, to enable the device to transmit the data to the transmission destination different from the predetermined transmission destination.

8. The device as claimed in claim 1, wherein the first application program causes the device to display the second screen without the first application program causing the device to execute the transmission request in response to receiving the transmission request.

9. The device as claimed in claim 1, wherein the transmission destination different from the predetermined transmission destination provides the service provided via the network, the service provided via the network being one of a cloud service, a service provided by an application service provider, and a Web service.

10. An information processing method executed in a device that includes a processor and a memory, the memory storing a plurality of application programs including a first application program and a second application program that are managed independent of each other, the first application program including instructions for causing the device to transmit data to a predetermined transmission destination, the second application program including instructions for causing the device to transmit the data to a transmission destination different from the predetermined transmission destination, the information processing method comprising:

the first application program, when executed by the processor, causing the device to display a first screen;

receive a transmission request input on the displayed first screen, the transmission request including a request to transmit the data, the request to transmit the data specifying the predetermined transmission destination as a transmission destination of the data;

display a second screen indicating completion of transmission of the data requested by the transmission request in response to receiving the transmission request, the second screen being different from the first screen; and delegate execution of the transmission request to the second application program in response to receiving the transmission request, and the second application program, when executed by the processor, causing the device to execute the received transmission request to transmit the data to the transmission destination different from the predetermined transmission destination in response to the execution of the transmission request being delegated to the second application program, wherein the first application program further causes the device to delegate execution of a request to execute a process related to a service provided via a network to the second application program, and the second application program causes the device to transmit the data to the transmission destination different from the predetermined transmission destination after executing the request to execute the process related to the service provided via the network, when the request to execute the process related to the service provided via the network is included in the transmission request whose execution is delegated to the second application program.

11. The information processing method as claimed in claim 10,
wherein the transmission request includes information indicating the predetermined transmission destination, and
wherein the first application program further causes the device to determine whether a predetermined character string is included in the information indicating the predetermined transmission destination, and to delegate the execution of the transmission request to the second application program in response to determining that the predetermined character string is included in the information.

12. The information processing method as claimed in claim 11,
wherein the first application program further causes the device to transmit the data to the predetermined transmission destination in response to determining that the predetermined character string is absent from the information.

13. The information processing method as claimed in claim 10, wherein the second application program causes the device to transmit the data to an information processing apparatus configured to execute a preset process on the transmitted data, in response to the execution of the transmission request being delegated to the second application program.

14. An information processing system including a device and at least one information processing apparatus connected to the device via a network, wherein the device includes
a processor; and
a memory storing a plurality of application programs including a first application program and a second application program that are managed independent of each other, the first application program including instructions for causing the device to transmit data to a predetermined transmission destination, the second application program including instructions for causing the device to transmit the data to the at least one information processing apparatus,
wherein the first application program, when executed by the processor, causes the device to
display a first screen;
receive a transmission request input on the displayed first screen, the transmission request including a request to transmit the data, the request to transmit the data specifying the predetermined transmission destination as a transmission destination of the data;
display a second screen indicating completion of transmission of the data requested by the transmission request in response to receiving the transmission request, the second screen being different from the first screen; and
delegate execution of the transmission request to the second application program in response to receiving the transmission request,
wherein the second application program, when executed by the processor, causes the device to
execute the received transmission request to transmit the data to the at least one information processing apparatus in response to the execution of the transmission request being delegated to the second application program, and
wherein the first application program further causes the device to delegate execution of a request to execute a process related to a service provided via the network to the second application program, and the second application program causes the device to transmit the data to the at least one information processing apparatus after executing the request to execute the process related to the service provided via the network, when the request to execute the process related to the service provided via the network is included in the transmission request whose execution is delegated to the second application program.

15. The information processing system as claimed in claim 14,
wherein the transmission request includes information indicating the predetermined transmission destination, and
wherein the first application program further causes the device to determine whether a predetermined character string is included in the information indicating the predetermined transmission destination, and to delegate the execution of the transmission request to the second application program in response to determining that the predetermined character string is included in the information.

16. The information processing system as claimed in claim 15,
wherein first application program further causes the device to transmit the data to the predetermined transmission destination in response to determining that the predetermined character string is absent from the information.

17. The information processing system as claimed in claim 14, wherein the at least one information processing apparatus is configured to execute a preset process on the transmitted data.

18. The information processing system as claimed in claim 14,
wherein the at least one information processing apparatus is configured to transmit the data to a transmission destination stored in correlation with user information in the at least one information processing apparatus.

* * * * *